(12) United States Patent
Cen

(10) Patent No.: US 7,411,969 B2
(45) Date of Patent: Aug. 12, 2008

(54) METHOD, SYSTEM, AND APPARATUS FOR A CREDIT BASED FLOW CONTROL IN A COMPUTER SYSTEM

(75) Inventor: Ling Cen, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 10/696,425

(22) Filed: Oct. 28, 2003

(65) Prior Publication Data

US 2005/0088967 A1 Apr. 28, 2005

(51) Int. Cl.
*H04L 12/56* (2006.01)
(52) U.S. Cl. ........................ 370/412; 370/469
(58) Field of Classification Search .......... 370/469, 370/412
See application file for complete search history.

(56) References Cited

U.S. PATENT DOCUMENTS 5,958,017 A * 9/1999 Scott et al. ................ 709/235
2005/0018609 A1 * 1/2005 Dally et al. ................ 370/235

* cited by examiner

*Primary Examiner*—Melvin Marcelo
(74) *Attorney, Agent, or Firm*—Blakely, Sokoloff, Taylor & Zafman LLP

(57) ABSTRACT

A system, apparatus, and method for a link layer protocol to utilize a main buffer and share the remaining link units according to a list buffer or FIFO. The system includes an efficient link layer to facilitate transmitting and receiving data and information. The list buffer is used to store the buffer indexes for all the link units for the respective virtual connections.

13 Claims, 5 Drawing Sheets

METHOD, SYSTEM, AND APPARATUS FOR A CREDIT BASED FLOW CONTROL IN A COMPUTER SYSTEM

BACKGROUND

1. Field

The present disclosure pertains to the field of protocols for computer systems. More particularly, the present disclosure pertains to a new method, system, and apparatus for an credit based flow control in a computer system.

Although the scope of the claimed subject matter is not limited in this respect, it is noted that some embodiments may include subject matter from the following co-pending applications: a first patent application with a Ser. No. of 10/833,963, and with a Title of "Simplified Two-Hop Protocol", with the inventor Ling Cen.

2. Description of Related Art

Computer systems may allow for connecting nodes with a Point to Point (PtP) network. Typically, a protocol controls the communication within a PtP network. For example, the protocol may be divided into a physical layer, link layer, and a protocol layer. The link layer may provide virtual channel (VC) services via a plurality of VC buffers.

Typically, the size of the VC buffers is designed such that there is no bubble or waste on a physical link when packets are sent between the nodes. Various factors affect the size of the link layer buffers, such as, round trip flight time, I/O delay, link buffer delay and multi-node arbitration delay. Thus, the link buffer's size is based on the average round trip delay from the transmission of a unit to the return of a credit. Therefore, each VC buffer for a physical link is sized according to the round trip delay (as exhibited in FIG. 1). However, this is very inefficient. For example, a system would utilize 53,280 bits at each node for a typical configuration of five VCs per direction, 144 bit link unit, 60 entry receiver buffer and 10 entry transmit buffer. The number 53,280 was determined by adding the memory requirement for the receiver of [5 (# of VCs)×64 ×144) to the transmitter of [5 (# of VCs)×10×144.

BRIEF DESCRIPTION OF THE FIGURES

The present invention is illustrated by way of example and not limitation in the Figures of the accompanying drawings.

DETAILED DESCRIPTION

The following description provides method and apparatus for improved multi-core processor performance despite power constraints. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

As previously described, a problem exists for protocols for a multi-node system. The prior art matches the number of VC's with the number of VC buffers and each of the VC buffer is sized according to the round trip delay. In contrast, the claimed subject matter efficiently utilizes VC buffers by incorporating at least one main buffer for each VC and sharing the remaining link buffers. The claimed subject matter may reduce memory size of the VC buffers and/or utilizes fewer bits in a packet header. The claimed subject matter will be discussed in further detail in FIGS. 2-5 of the specification.

Figure 1:
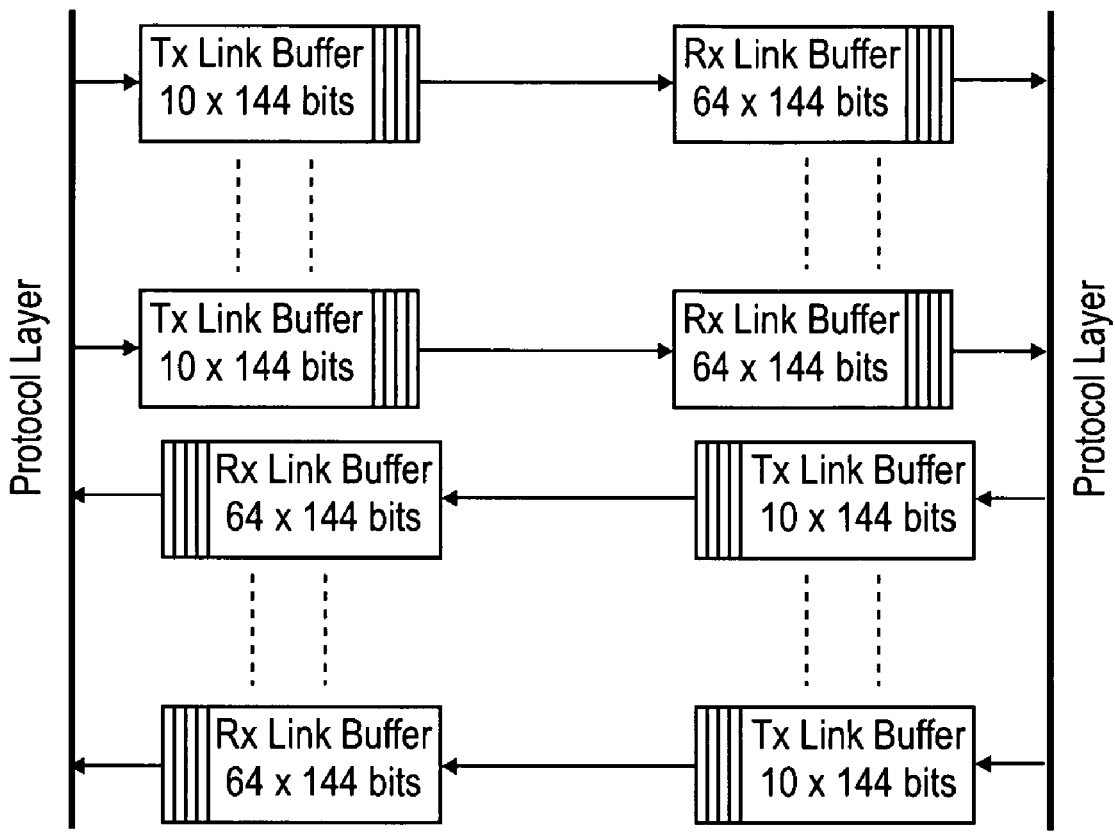
FIG. 1 illustrates the prior art.
Figure 2:
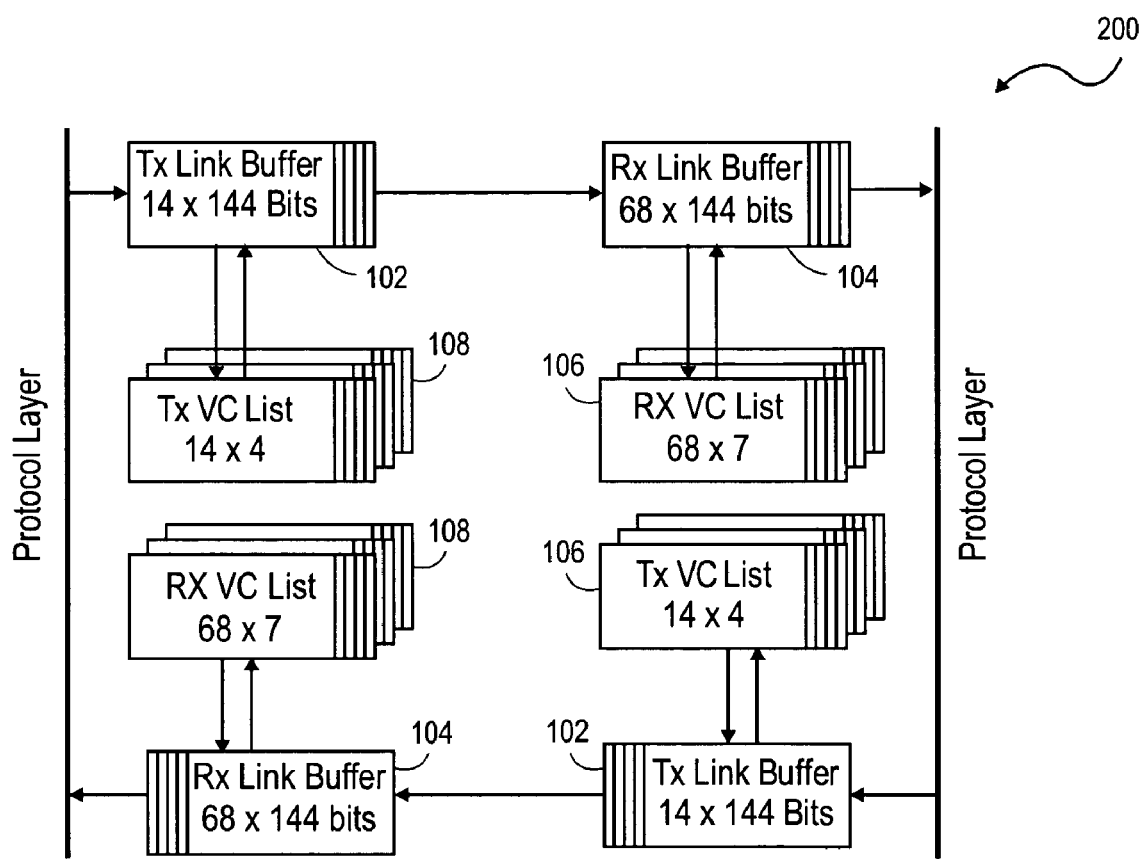
FIG. 2 illustrates a schematic utilized in accordance with an embodiment.

FIG. 2 illustrates a schematic 200 utilized in accordance with an embodiment. In one embodiment, schematic 200 illustrates a protocol for a link layer between two protocol layers for a multi-node computer system.

The schematic depicts an efficient link layer to facilitate transmitting and receiving data and information. In one embodiment, the link layer facilitates transmitting and receiving packets containing data, control information, and/or header information.

In one embodiment, the protocol and schematic allows the receiver to reserve one link unit or one full packet for each VC, while the remaining link buffers are shared. For example, one VC allow for a Transmit (Tx) Link Buffer 102 and Receiver (Rx) Link 104. The remaining link buffers for the transmitter 108 and receiver 106 are shared according to a list buffer or FIFO (108 and 106) that is maintained for each VC. The list buffers are maintained for each VC. For example, the list buffer 108 is for the main transmit buffer and the list buffer 106 is for the main receiver buffer 104.

In one embodiment, the list buffer is to store the buffer indexes for all the link units for the respective VC. In the event that one list of link units for a particular VC is blocked, the protocol allows to switch to another VC's list of link units, which in essence is similar to switching from one VC's link buffer to another. Consequently, the VC is allowed to progress without an obstacle or blocking from another VC and a single main buffer is utilized.

In one embodiment, the memory size of main transmit or receiver buffer is based at least in part on: (the round trip delay)+(the number of VCs)−(1). In the same embodiment, the size of each main buffer applies to both the transmitter and receiver.

Therefore, the claimed subject matter facilitates a protocol that utilizes the following number of memory bits for each node:

Receiving: 5 (number of VCs)×(7)×(64−4)×(size of list buffer)

Transmitting 5 (number of VCs)×(4)×(14)+5(number of VCs)×(10+4)×(144),

Thus, the number of bits for the receiving and transmitting buffers results in 14,468 bits, a significant 4× drop in memory requirements as compared to the prior art.

However, the claimed subject matter is not limited to the previous example of memory requirements. One skilled in the art appreciates modifying the number of VCs or number of shared link buffers or list buffer.

Figure 3:
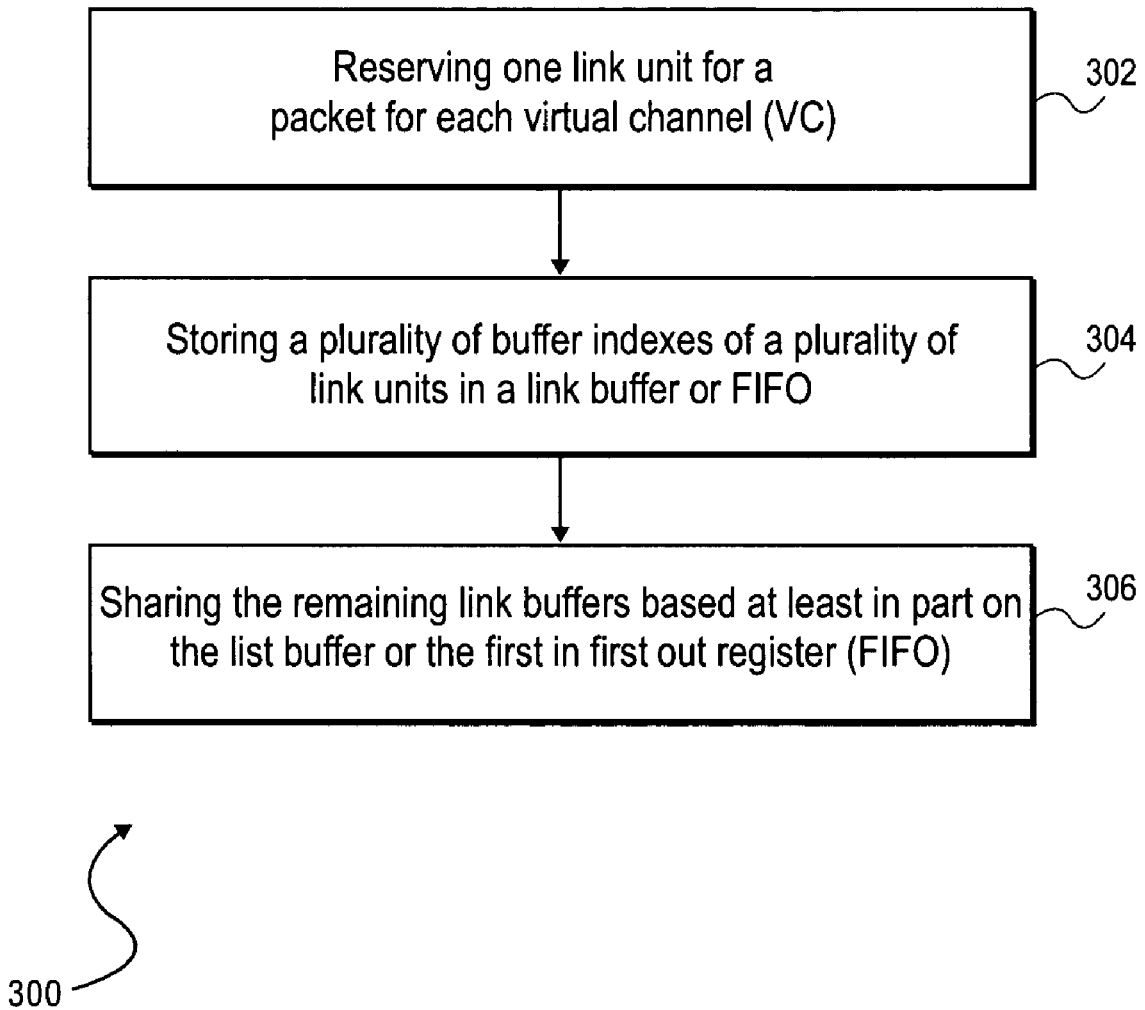
FIG. 3 illustrates a flowchart for a method utilized in accordance with an embodiment.

FIG. 3 illustrates a flowchart for a method utilized in accordance with an embodiment. The method depicts one example of efficient memory usage for defining a link layer protocol. A block 302 depicts reserving one link unit or a packet for each virtual channel (VC). Subsequently, a block 304 depicts storing a plurality of buffer indexes of a plurality of link units in a link buffer or FIFO. Consequently, the remaining link buffers are shared based at least in part on the list buffer or the first in first out register (FIFO), as depicted by a block 306.

In one embodiment, an index from an entry of the list buffer or FIFO addresses a single main buffer for the single link unit. If one list is blocked for any reason, the link layer control switches to another virtual channel's list.

Figure 4:
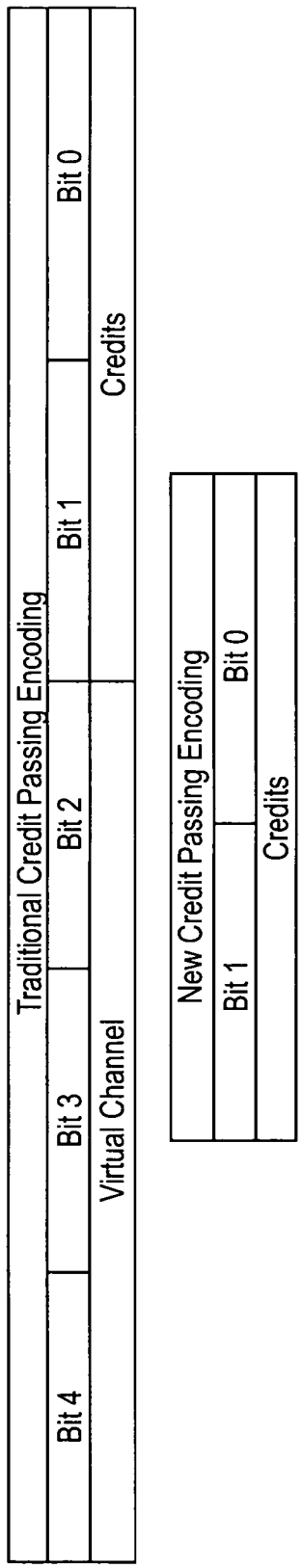
FIG. 4 illustrates a chart utilized in accordance with an embodiment.

FIG. 4 illustrates a chart utilized in accordance with an embodiment. In one embodiment, the chart illustrates a scheme for new credit passing encoding. For example, the sender utilizes a bit in the link unit for indicating whether this link unit is using the reserved credit or the shared VC buffer when a link unit of a particular VC is sent. In one embodiment, the sender initially utilizes the resources of the shared VC buffer and, when necessary, will utilize the reserved credit. Consequently, the reserved credit is not frequently used if the shared VC buffer is properly sized. Therefore, this result in saving bits that may be utilized for credit passing. For example, credits may be returned with a VC field and a credit field, as depicted in FIG. 4. In one embodiment for a link buffer management, the shared VC credits are returned in a normal packet. In contrast, the reserved credits are returned in special link packets. Therefore, the bits in the header may be utilized for other purposes, such as, performance critical functions.

Figure 5:
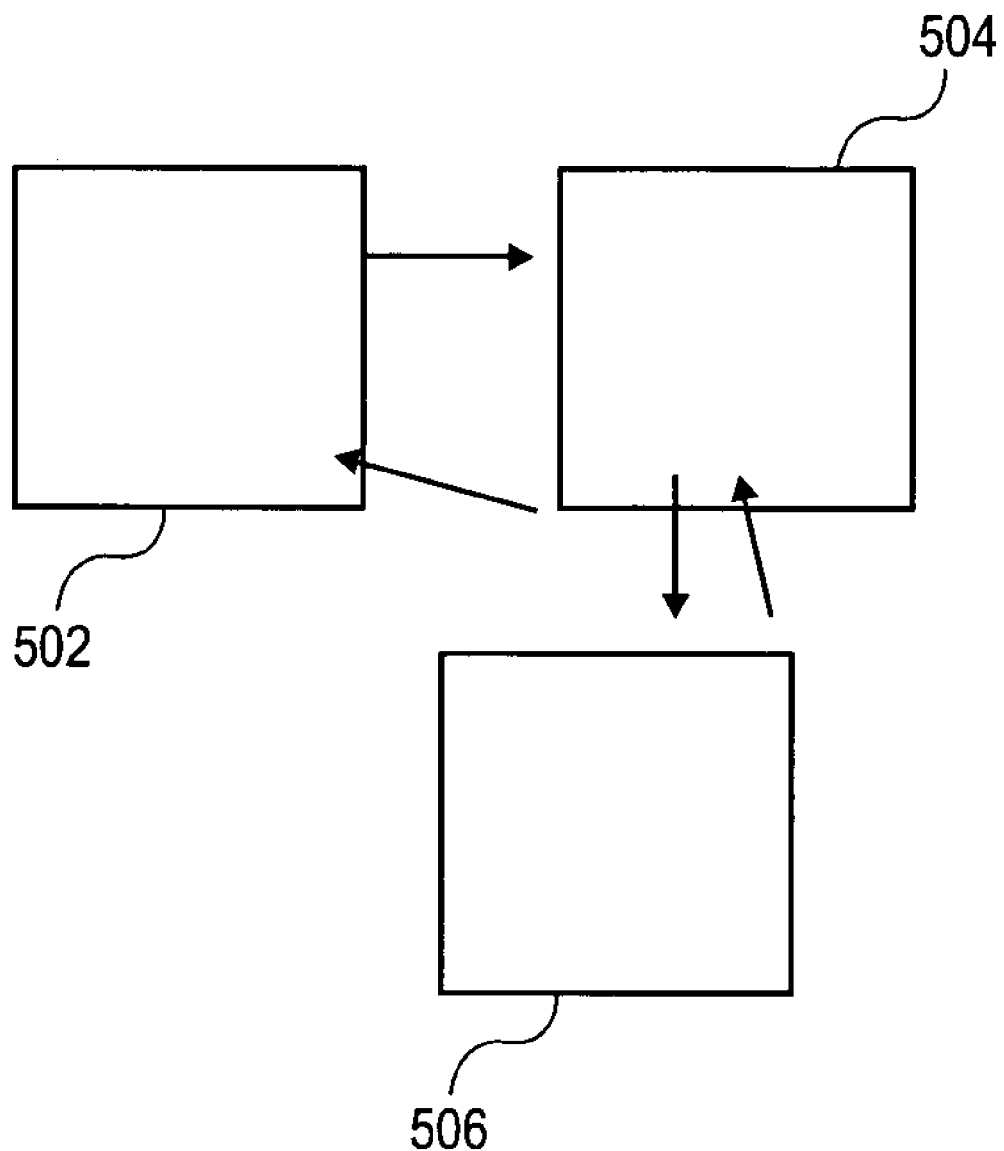
FIG. 5 illustrates a system in accordance with one embodiment.

FIG. 5 depicts a system in accordance with one embodiment. The system in one embodiment is a processor 502 that is coupled to a chipset 504 that is coupled to a memory 506. In one embodiment, the system is a point to point network of a multiple nodes for processors. For example, the chipset performs and facilitates various operations, such as, memory transactions between the processor and memory. In one embodiment, the system comprises one or all of the previous embodiments depicted in connection with FIGS. 2-4 of the specification to facilitate a credit based flow control.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method for a link layer protocol comprising:
reserving a single buffer of a plurality of buffers for each of a plurality of virtual channels (VCs);
storing a plurality of buffer indexes corresponding to a plurality of buffers not reserved for each VC; and
sharing the buffers not reserved for each VC among a plurality of VCs.

2. The method of claim 1 wherein storing the plurality of buffer indexes comprises storing the plurality of buffer indexes in a first in first out memory (FIFO).

3. The method of claim 2 wherein the sharing remaining buffers is based at least in part on whether the buffer is used for receiving or transmitting data.

4. The method of claim 1 wherein sharing remaining link buffers allows for switching from one list of link units for a first VC when blocked, by switching from the first VC's link buffer to the second VC's link buffer.

5. An apparatus comprising:
a main transmit buffer and a main receiver buffer for each virtual channel (VC) for a link layer protocol of the point to point network;
a plurality of link buffers to be shared based at least in part on a link buffer list for each virtual channel; and
the main receiver and transmit buffers to be sized based at least in part on a round trip delay time.

6. The apparatus of claim 5 wherein the apparatus is a link layer component of an electronic system.

7. The apparatus of claim 5 wherein the apparatus facilitates the switch from a first VC's link buffer or FIFO to a second VC's link buffer or FIFO if the first VC's link buffer or FIFO is blocked.

8. A link layer apparatus comprising:
a main transmit buffer and a main receiver buffer for each virtual channel (VC);
a main transmit buffer and a main receiver buffer for each virtual channel (VC) of the point to point network;
a sender component of a link unit coupled to send packets corresponding to a VC to indicate whether the link unit utilized a reserved credit or a shared VC buffer, the reserved credit to be utilized for another function if the shared VC buffer is used instead of the reserved credit.

9. The link layer apparatus of claim 8 wherein the sender component facilitates a switch from a first VC's link buffer or FIFO to a second VC's link buffer or FIFO if the first VC's link buffer or FIFO is blocked.

10. A system comprising:
at least two processors coupled into a point to point network;
a main transmit buffer and a main receiver buffer for each virtual channel (VC) of the point to point network;
a plurality of link buffers to be shared between the main transmit buffer and the main receiver buffer based at least in part on a link buffer for each virtual channel; and
a sender component of a link unit coupled to send packets corresponding to a VC to indicate whether the link unit utilized a reserved credit or a shared VC buffer, the reserved credit be utilized for another function if the shared VC buffer is used instead of the reserved credit.

11. The system of claim 10 wherein the sender component facilitates a switch from a first VC's link buffer or FIFO to a second VC's link buffer or FIFO if the first VC's link buffer or FIFO is blocked.

12. A system comprising:
at least two processors coupled into a point to point network;
a main transmit buffer and a main receiver buffer for each virtual channel (VC) for a link layer protocol of the point to point network;
a plurality of link buffers to be shared based at least in part on a link buffer list for each virtual channel; and
the main receiver and transmit buffers to be sized based at least in part on a round trip delay time.

13. The system of claim 12 wherein the link layer protocol facilitates the switch from a first VC's link buffer or FIFO to a second VC's link buffer or FIFO if the first VC's link buffer or FIFO is blocked.

* * * * *